Nov. 17, 1953 — G. A. SWEETMAN — 2,659,464
LUGGAGE CARRIER
Filed March 16, 1949 — 2 Sheets-Sheet 1

G. A. Sweetman
INVENTOR
BY C. A. Snow & Co.
ATTORNEYS.

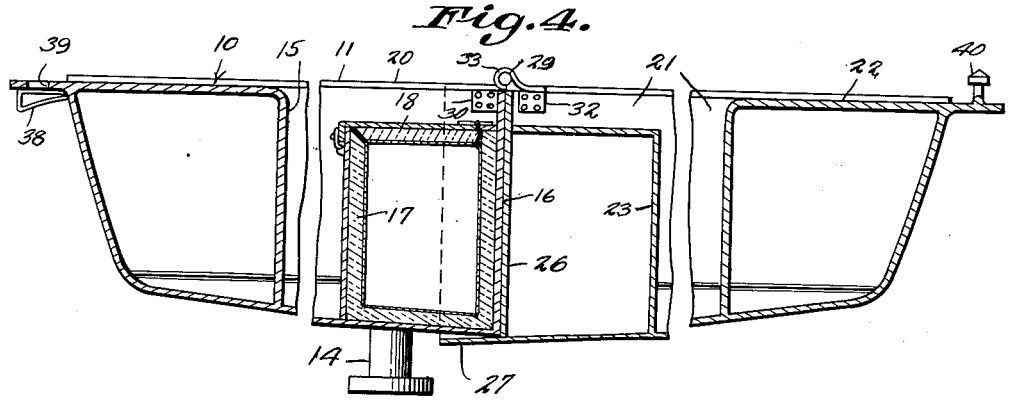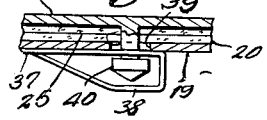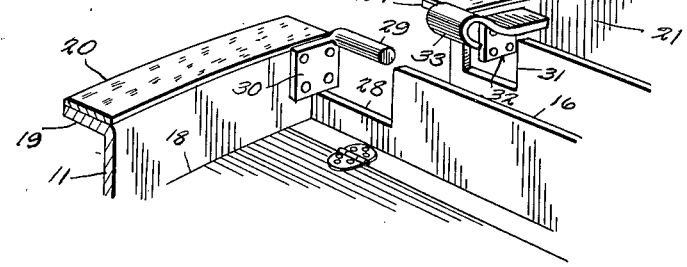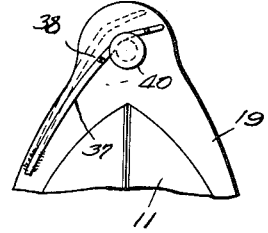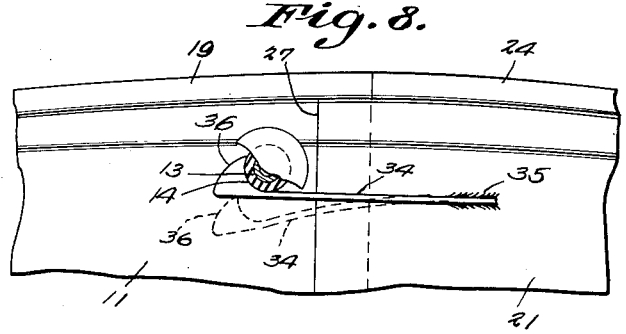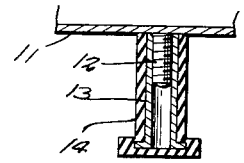

Patented Nov. 17, 1953

2,659,464

UNITED STATES PATENT OFFICE 2,659,464

LUGGAGE CARRIER

George A. Sweetman, Trinidad, Colo.

Application March 16, 1949, Serial No. 81,746

1 Claim. (Cl. 190—1)

This invention relates to an enclosed luggage carrier, adapted to be transported on the roof of an automobile.

An important object of the present invention is to provide a luggage carrier which can be sealed tight against the admission of dust, water, or the elements.

Other important objects are to provide a luggage carrier which will be streamlined; capable of ready attachment to or detachment from the vehicle roof; adapted for swift disconnection into separated sections; capable of use as a boat; adapted for production at relatively low cost; and capable of being constructed so as to be quite strong while yet light in weight.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Fig. 4 is an enlarged longitudinal section on line 4—4 of Fig. 3.

Fig. 5 is an enlarged section through a means for locking the carrier sections in closed position.

Fig. 6 is a bottom plan view of the means shown in Fig. 5.

Fig. 7 is a fragmentary enlarged perspective view of a separable hinge connection between the sections.

Fig. 8 is a fragmentary bottom plan view showing a means for locking the sections in opened position.

Fig. 9 is a vertical section through a foot on which the carrier is supported on top of a vehicle.

Figure 1:
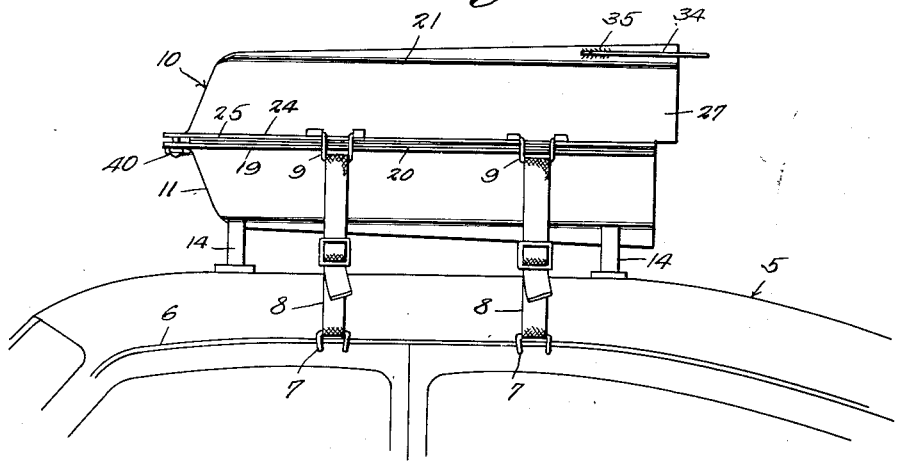
Fig. 1 is a side elevational view of a luggage carrier constructed in accordance with the invention, as it appears when in regular use on the roof of a vehicle.

Referring to the drawings in detail, the reference numeral 5 generally designates a vehicle of conventional construction having the usual drip strip or flange 6 under which, on either side of the vehicle, hooks 7 engage, said hooks being carried at the lower ends of adjustable straps 8, the upper ends of which are passed through pivoted loops 9 secured to the carrier, said carrier being generally designated 10.

The luggage carrier 10 comprises a pair of separably connected sections. One section 11, when the carrier is being transported upon the roof of the vehicle 5, is the lower section, and is supported in spaced relation to said vehicle roof by any suitable means, said means in the present instance comprising a plurality of spaced depending threaded studs 12 (Fig. 9) extending downwardly from the bottom of the section 11, there being threaded upon said depending studs the sleeves 13 of pipe material or the like providing supporting legs, said sleeves having flanges at their lower ends to provide feet. Enclosing each sleeve 13 completely is the protective covering 14 of rubber or similar material, which prevents scratching of the vehicle's paint.

As readily seen from the drawings, the section 11 when viewed in top plan (see Fig. 3) is approximately triangular in shape, tapering to a point at one end, and having the other end widened and squared off.

For the purpose of giving the section 11 a high characteristic of buoyancy when floating in the water, I prefer that there be provided in the section 11 at the tapered end a pontoon 15 comprising a sealed compartment.

At the other end, section 11 is provided with the vertical, flat end wall 16 against which, inside the section, there is mounted a chest 17 having the hinged lid 18, so as to provide a storage compartment for food, groceries, and the like and said chest 17 is insulated, lined, and covered in the manner of an ice chest. When emptied of its contents, chest 17 is also adapted to serve as a pontoon, the hinged lid 18 closing tightly for this purpose and also for the purpose of keeping the contents of the chest in a refrigerated condition.

Along the upper edge of the side walls of the section 11, I form a flange 19, covered with cork 20 to provide a sealing gasket.

Figure 2:
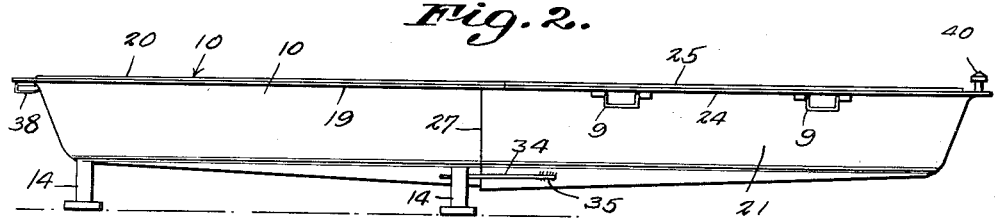
Fig. 2 is a side elevational view of the carrier opened for use as a boat.

Referring now to the other section of the carrier, this is designated 21 and is of approximately the same shape as the section 11, having one end squared off and abutting against the end wall 16 when the sections are opened as in Fig. 2, and having the other end tapered to a point and provided with the pontoon 22. The widened end of section 21 is provided with a pontoon 23. It may be noted that the pontoons 15, 22 and 23, and the chest 18, can serve as seats when the carrier is open for use as a boat as in Figs. 2 and 3.

Section 21 is formed, at the upper edge of its side walls, with a flange 24 corresponding to flange 19 of section 11, and flange 24 is covered with cork 25.

Thus, when the sections are folded one upon the other as in Fig. 1, the cork gaskets 20, 25 will be pressed tightly against each other, to provide means for sealing the enclosed carrier against the entrance of dust, water, or the elements. Thus, when the carrier is being transported upon the roof of a vehicle, road dust cannot enter between the sections, thus keeping the contents, such as luggage, camping equipment, and the like, clean and free of moisture and grit. Additionally, the enclosed carrier as folded in Fig. 1, is capable of removal from the top of the vehicle and can be floated across a stream or the like, with the cork gaskets preventing the entrance of water. When used in this manner the enclosed luggage carrier operates as a buoy.

It may be noted, in this connection, that when the enclosed luggage carrier is removed from the top of a vehicle, the straps 8 can be passed directly under the section 11, and secured at their opposite ends to the loops 9 on the other side of the carrier. Said loops 9, as will be noted from Fig. 1, are carried by the section 21. Accordingly, if the straps 8 are passed under the section 11, and secured to loops 9 on section 21 at the other side, again the carrier will be held with the sections 11, 21 in sealed relation.

The end wall 26 of the section 21 abuts against the end wall 16 when the sections are open for use as a boat, and in this position of the sections, an end flange 27 extended from the end wall 26 encloses the adjacent end of section 11, so that in effect one section pivots within the other section providing a brace for the sections to hold them in their extended positions.

The sections are hingedly connected, and to this end, I provide at the ends of the end wall 16, the recesses 28, into which extend the transversely extended hinge pins 29 integral with plates 30 secured in any suitable manner to the side walls of the section 11. The section 21 has similar recesses 31, and plates 32 are secured to the side walls of the section 21, said plates 32 being integral with hinge plates 33 that are curved so as to extend around the hinge pins 29. However, the hinge plates 33 are not completely closed, and the purpose of this is to permit complete separation of the sections 11, 21 with speed and facility. Complete separation in this manner is desirable, so that the luggage carrier can be carried to places where the vehicle will not go, as in rough country. Under these circumstances, the sections can be completely separated, with one being carried by one or more members of a camping party, and the other being carried by other members of said party.

Figure 3:
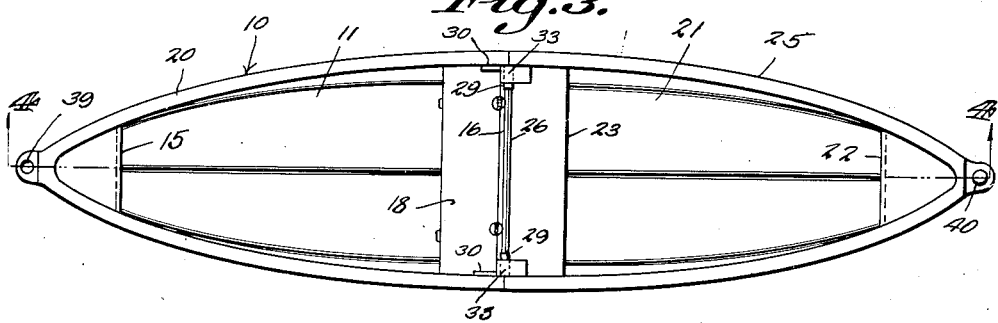
Fig. 3 is a top plan view of the carrier opened.

When the sections are slung on their hinges to the open position illustrated in Figs. 2 and 3, a latching means is provided for holding them in said extended position. To this end, I provide on the bottom of the section 21, adjacent each side thereof, the spring latch 34, having a fixed connection 35 to the bottom of the section 21.

These spring latches 34 extend beyond the end flanges 27, so that when the sections are swung to open position, spring arms 34, having at their free ends the hooks 36 will be engaged by the protecting covers 14 of the supporting legs 13, and will be cammed outwardly to the dotted line position illustrated in Fig. 8, whereupon they will return to the full line position illustrated in this figure, in which position they will lock the sections together in extended relation.

I also provide a means for locking the sections in closed position, and to this end, I provide a spring arm 37 having a fixed connection at one end to the underside of the flange 19 at the pointed end of the section 11. At its free end, spring arm or latch 37 is formed with the closed eye 38 underlying opening 39 formed in said flange.

The pointed end of the section 21 has an upstanding pointed stud 40 having an enlarged head, and when the sections are swung to closed position, the head of the stud 40 will extend through the opening 39, and will cam the spring arm 37 to the dotted line position illustrated in Fig. 6, after which the spring arm 37 will return to normal position to lock the sections against accidental opening.

The important characteristics of the luggage carrier may now be readily noted. The luggage carrier when used on top of the vehicle, is fully streamlined as readily seen from Fig. 1, so as to represent no inconvenience to vehicle movement during transportation of the luggage carrier. Additionally, the carrier is readily attached to or detached from the vehicle, and when removed from the vehicle, can still be secured with its sections 11, 21 in substantially air and water tight relationship. The carrier, then, is swiftly and readily convertible to a boat, and if so desired, can even become two boats by complete disconnection of the sections. In any event, disconnection of the sections permits their being transported separately whenever necessary or desired.

It will be understood that various changes in design can be made within the spirit of the invention as claimed. For example, the carrier can be made of any suitable material, such as metal, whether corrugated or smooth as shown, and various other changes may obviously be found desirable.

What is claimed is:

A combination luggage carrier and boat comprising a pair of elongated hollow bodies having open tops, a flat panel carried by each body adjacent one end thereof, the sides of the bodies converging as they recede from their respective panels, interconnected means carried by the bodies adjacent the upper edges of the panels for hingedly coupling said bodies together, so that one of said bodies may be folded and superimposed upon the other body, an outstanding flange carried by each side of each body adjacent the upper edge thereof, sealing gaskets carried by the flanges for cooperation in excluding moisture from the interior of the bodies when one body is superposed upon the other, strap loops carried by one of the bodies for receiving hold down straps attached to a carriage by which the bodies may be secured to the carriage and the sealing gaskets held in juxtaposed and sealed relation, a skirt carried by the body having the strap loops, said skirt projecting longitudinally from said body at the panelled end thereof for receiving the panelled end of the other body, and feet carried by the body opposite that carrying the strap loops for holding said bodies in spaced relation to the carriage with which the strap loops are engaged.

GEORGE A. SWEETMAN.

References Cited in the file of this patent

UNITED STATES PATENTS

| Number | Name | Date |
|---|---|---|
| 1,681,685 | Rodgers | Aug. 21, 1928 |
| 1,691,633 | Bertram | Nov. 13, 1928 |
| 1,899,900 | Nelson | Feb. 28, 1933 |
| 2,157,186 | Pinter, Sr. et al. | May 9, 1939 |
| 2,256,038 | Woodruff | Sept. 16, 1941 |
| 2,422,930 | Rutledge | June 24, 1947 |
| 2,440,821 | Godwen | May 4, 1948 |
| 2,446,092 | Lait | July 27, 1948 |

FOREIGN PATENTS

| Number | Country | Date |
|---|---|---|
| 28,809 | Great Britain | Sept. 3, 1930 |